(12) United States Patent
Pinkos et al.

(10) Patent No.: US 6,401,351 B1
(45) Date of Patent: Jun. 11, 2002

(54) SENSOR SYSTEM FOR DETERMINING RELATIVE DISPLACEMENT OF AN OBJECT USING A FLEXIBLE RETRACTABLE ACTIVATION MEMBER

(75) Inventors: Andrew F. Pinkos, Clarkston; John P. Bunge, Farmington Hills, both of MI (US)

(73) Assignee: Trilogy Technologies, Inc., Auburn Hills, MI (US)

( * ) Notice: Subject to any disclaimer, the term of this patent is extended or adjusted under 35 U.S.C. 154(b) by 0 days.

(21) Appl. No.: 09/590,834

(22) Filed: Jun. 9, 2000

(51) Int. Cl.$^7$ ................................................ G06M 3/14
(52) U.S. Cl. ........................................................ 33/755
(58) Field of Search ........................... 73/432.1; 33/700, 33/707, 710, 711, 732, 734, 736, 738, 743, 754–756, 759–762, DIG. 3, 755; 356/615, 620, 634

(56) References Cited

U.S. PATENT DOCUMENTS

| | | | |
|---|---|---|---|
| 3,526,890 A | * | 9/1970 | Malina et al. ................. 33/732 |
| 3,749,203 A | | 7/1973 | Hoelscher |
| 3,786,929 A | | 1/1974 | Hathcock, Jr. |
| 3,815,711 A | | 6/1974 | Hoelscher |
| 4,110,610 A | | 8/1978 | Mueller et al. |
| 4,245,721 A | | 1/1981 | Masel |
| 4,270,046 A | | 5/1981 | Werking |
| 4,346,788 A | | 8/1982 | Shung |
| 4,362,224 A | | 12/1982 | Fairbrother |
| 4,494,628 A | | 1/1985 | Uherek et al. |
| 4,625,329 A | | 11/1986 | Ishikawa et al. |
| 4,682,088 A | | 7/1987 | Sullivan |
| 4,765,063 A | * | 8/1988 | Sing ............................. 33/755 |
| 4,812,838 A | | 3/1989 | Tashiro et al. |
| 4,845,415 A | | 7/1989 | Steely |
| 4,909,560 A | | 3/1990 | Ginn |
| 4,920,338 A | | 4/1990 | Tsunoda et al. |
| 5,037,206 A | | 8/1991 | Etzkorn et al. |
| 5,074,583 A | | 12/1991 | Fujita et al. |
| 5,078,333 A | | 1/1992 | Hester |
| 5,130,529 A | | 7/1992 | Muro |
| 5,286,972 A | * | 2/1994 | Falk et al. .................... 33/756 |
| 5,475,592 A | | 12/1995 | Wnuk et al. |
| 5,481,078 A | | 1/1996 | Asche |
| 5,483,853 A | | 1/1996 | Moradell et al. |
| 5,497,326 A | | 3/1996 | Berland et al. |
| 5,520,062 A | | 5/1996 | Watanabe et al. |
| 5,653,462 A | | 8/1997 | Breed et al. |
| 5,751,129 A | | 5/1998 | Vergin |
| 5,803,491 A | | 9/1998 | Barnes et al. |
| 5,808,374 A | | 9/1998 | Miller et al. |
| 5,810,606 A | | 9/1998 | Ballast et al. |

(List continued on next page.)

FOREIGN PATENT DOCUMENTS

| | | | | |
|---|---|---|---|---|
| DE | 3019190 | * | 11/1981 | ................. 33/761 |
| JP | 0082901 | * | 5/1985 | ................. 33/761 |

*Primary Examiner*—Robert Raevis
(74) *Attorney, Agent, or Firm*—Brooks & Kushman P.C.

(57) ABSTRACT

A sensor system for detecting a movement of a first portion of a structure relative to a second portion of the structure is disclosed. The sensor system has a flexible retractable member having a first end pivotably attached to one of the first portion of the structure and the second portion of the structure and a second end driven by the other of the first portion of the structure and the second portion of the structure. The flexible retractable member is wound and unwound about the pivotal attachment upon relative movement of the first end with respect to the second end. Further, the flexible retractable member has at least one activation portion and at least one deactivation portion. The sensor system further includes a sensor for detecting the at least one activation portion and the at least one deactivation portion for determining at least one position of the second portion relative to the first portion of the structure.

11 Claims, 6 Drawing Sheets

U.S. PATENT DOCUMENTS

| | | |
|---|---|---|
| 5,847,694 A | 12/1998 | Redford et al. |
| 5,848,671 A | 12/1998 | Kattainen |
| 5,848,802 A | 12/1998 | Breed et al. |
| 5,893,582 A | 4/1999 | Allen et al. |
| 5,967,549 A | 10/1999 | Allen et al. |
| 5,967,594 A | 10/1999 | Ramanujam |
| 6,053,529 A | 4/2000 | Frusti et al. |
| 6,082,489 A | 7/2000 | Coste et al. |
| 6,095,555 A | 8/2000 | Becker et al. |
| 6,113,139 A | 9/2000 | Heximer et al. |
| 6,116,638 A | 9/2000 | Hosoda |
| 6,142,513 A | 11/2000 | Schoos et al. |
| 6,151,540 A | 11/2000 | Auishetty |
| 6,170,866 B1 | 1/2001 | Popp et al. |
| 6,175,414 B1 | 1/2001 | Holzapfel et al. |

* cited by examiner

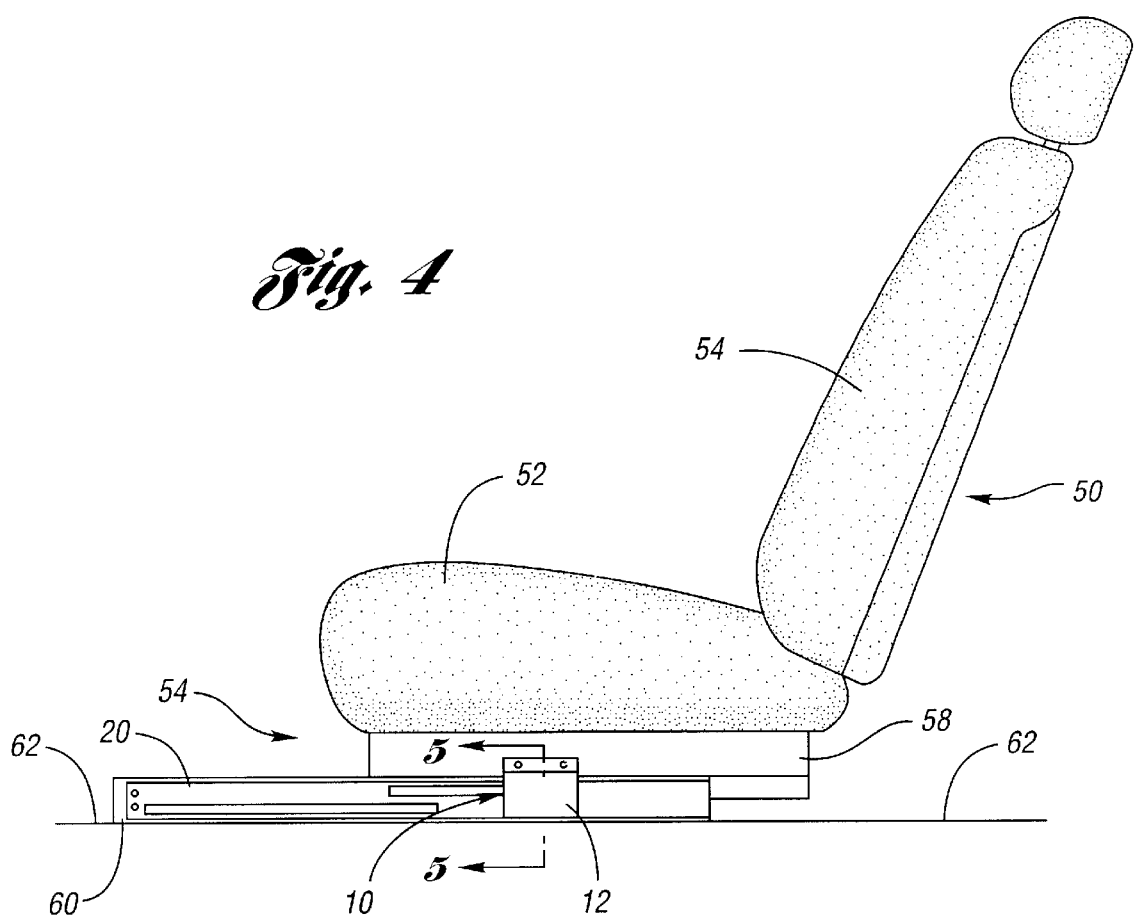
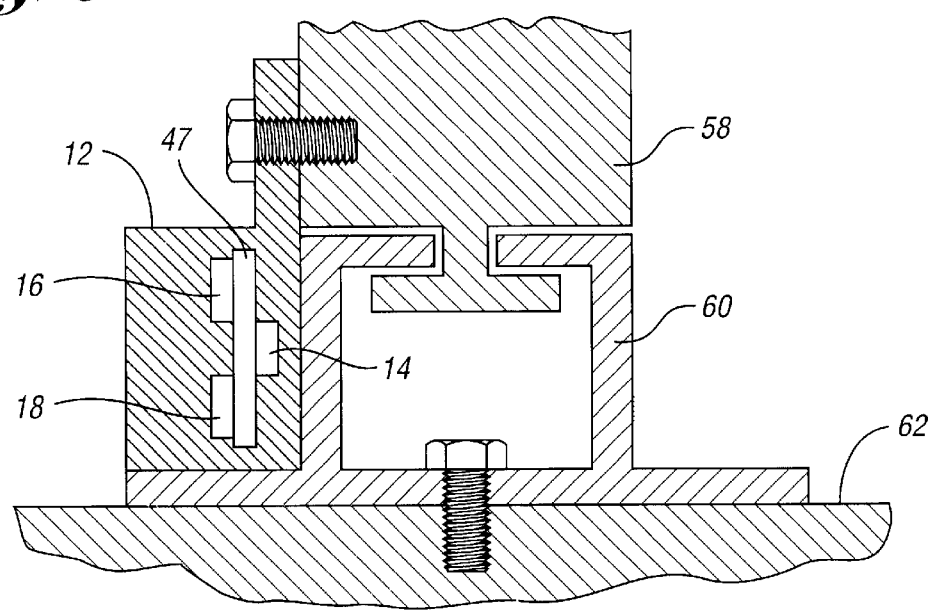

SENSOR SYSTEM FOR DETERMINING RELATIVE DISPLACEMENT OF AN OBJECT USING A FLEXIBLE RETRACTABLE ACTIVATION MEMBER

TECHNICAL FIELD

The present invention relates to sensing systems for determining relative motion of an object with respect to a reference structure.

BACKGROUND ART

Vehicle seat location is being utilized more frequently to control the operation of other vehicle systems. In the prior art, optical decoders which have an optical light source and optical receivers arranged to read a rotating encoder disk are used to determine a precise seat location. This type of seat position sensing system was used, for example, in memory seats. In the memory seat application a precise location of the vehicle seat was required. Other prior art sent position sensing systems have used potentiometers to determine seat position.

A more recent use for seat location information is for controlling a vehicle restraint system. More specifically, it is important to know whether an occupant is in close proximity to an inflatable restraint system, such as an airbag. To increase the effectiveness of an inflatable restraint system the airbag is deployed with less force when an occupant is in close proximity to the airbag. Conversely, when the occupant is farther away from the airbag the airbag is deployed with greater force. Other prior art proximity detection systems use occupant position sensors utilizing infrared, ultrasonic, and radiowave technologies, however these systems have proven to be far too expensive to implement in today's vehicles and have questionable accuracy.

Therefore, a need exists for a low cost vehicle seat position sensing system which accurately determines the seat position. The system should also prevent debris from interfering with the operation of the sensor system.

DISCLOSURE OF INVENTION

In accordance with an aspect of the present invention a sensor system for detecting a movement of a first portion of a structure relative to a second portion of the structure is provided. The sensor system has a flexible retractable member having a first end pivotably attached to one of the first portion of the structure and the second portion of the structure and a second end driven by the other of the first portion of the structure and the second portion of the structure. The flexible retractable member is wound and unwound about the pivotal attachment upon relative movement of the first end with respect to the second end. Further, the flexible retractable member has at least one activation portion and at least one deactivation portion. The sensor system further includes a sensor for detecting the at least one activation portion and the at least one deactivation portion for determining at least one position of the second portion relative to the first portion of the structure.

In accordance with an aspect of the present invention the sensor further comprises an electro-luminescent component in communication with at least one optical receiver.

In accordance with another aspect of the present invention the electro-luminescent component is a light emitting diode.

In accordance with still another aspect of the present invention the electro-luminescent component is an incandescent light source.

In accordance with still another aspect of the present invention the optical receiver is a phototransistor.

In accordance with still another aspect of the present invention the sensor is a magnet in communication with at least one hall effect sensor.

In accordance with still another aspect of the present invention a sensor housing is provided for holding the sensor adjacent the retractable member.

In accordance with still another aspect of the present invention the at least one activation zone is a longitudinally extending slot.

In accordance with still another aspect of the present invention the at least one deactivation zone is a longitudinally extending opaque area.

In accordance with still another aspect of the present invention the at least one activation zone is a longitudinally extending magnetic material.

In accordance with still another aspect of the present invention the at least one deactivation zone is a longitudinally extending non-magnetic area.

In accordance with still another aspect of the present invention the at least one activation zone is a longitudinally extending light reflecting area.

In accordance with still another aspect of the present invention the at least one deactivation zone is a longitudinally extending light non-reflecting area.

In accordance with still another aspect of the present invention a payout spool is provided for winding and unwinding the first end of the flexible retractable member thereabout.

In accordance with still another aspect of the present invention a take-up spool is provided for winding and unwinding the second end of the flexible retractable member thereabout.

In accordance with still another aspect of the present invention a drive spool is provided for rotatably driving the take-up spool in response to movement of one of the first and second portions.

In accordance with still another aspect of the present invention a drive wire is provided having a first drive wire end rotatably attached to the take-up spool and a second drive wire end attached to one of the first and second portions of the structure.

In accordance with yet another aspect of the present invention a sensor system for determining a position of a first portion of a vehicle seat relative to a second portion of the vehicle seat is provided. The sensor system includes a flexible retractable member having a first end pivotally attached to one of the first portion of the seat and a second portion of the vehicle seat and a second end driven by the other of the first and second portions of the vehicle seat, wherein the retractable member has at least one activation portion and at least one deactivation portion and a sensor for detecting the at least one activation portion and at least one deactivation for determining at least one position of the movable portion of the vehicle seat.

The above features, benefits and advantages and other features, benefits and advantages of the present invention are readily apparent from the following detailed description of the best mode for carrying out the invention when taken together with the accompanying drawings.

BRIEF DESCRIPTION OF DRAWINGS

FIG. 4 is a side perspective view of the sensor system for determining seat location mounted to a vehicle seat, in accordance with the present invention;

FIG. 5 is a cross-sectional view of the sensor system as indicated in FIG. 4 illustrating the attachment of the sensor system to the vehicle seat track assembly, in accordance with the present invention;

BEST MODE FOR CARRYING OUT THE INVENTION

Figure 1:
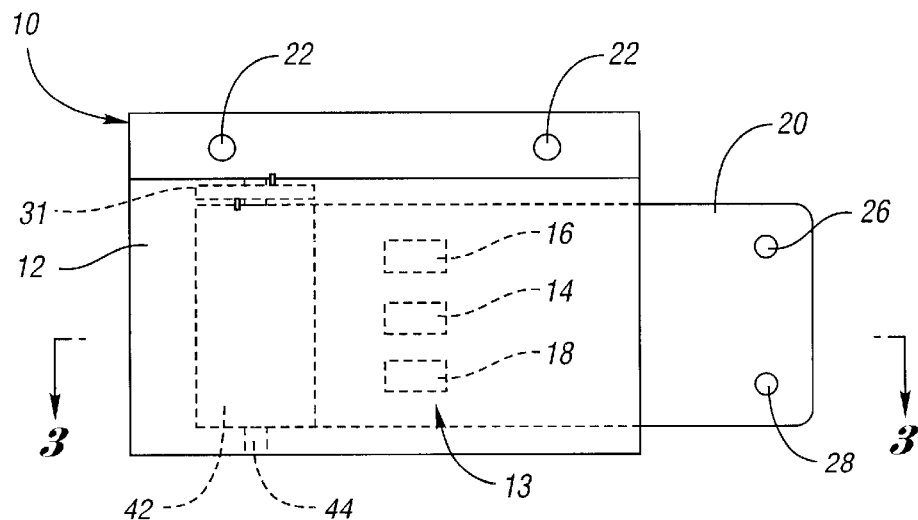
FIG. 1 is a front perspective view of the sensor system for determining seat location, in accordance with the present invention.

Referring now to FIG. 1, a front perspective view of a seat position sensing system 10 is illustrated, in accordance with the present invention. System 10 includes a sensor housing 12, which contains a sensing element 13, and a flexible retractable member or shield 20. Sensor housing 12 is mounted, preferably, to a movable object such as a vehicle sent via mounting apertures 22 and 24. Shield 20 includes a pair of shield apertures 26 and 28 for mounting the shield to a fixed reference, such as a vehicle floor. Shield 20 is wound around a spool 30 and a coil spring 31 is provided for biasing spool 30 in a rewind direction for winding shield 20 onto spool 30.

Figure 2:
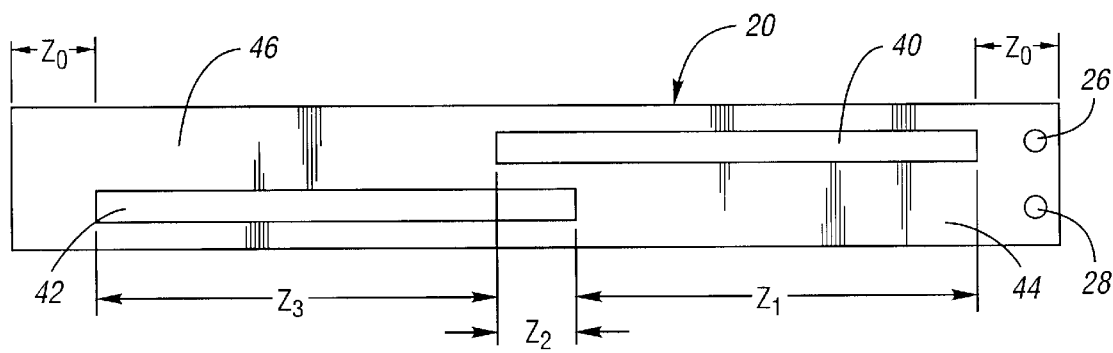
FIG. 2 is a front perspective view of the retractable shade, in accordance with the present invention.

Referring now to FIG. 2, a front view of shield 20 is illustrated, in accordance with the present invention. As shown in a fully protracted state shield 20, includes a first activation zone 40, a second activation zone 42, a first deactivation zone 44, and a second deactivation zone 46. First deactivation zone 44 is disposed adjacent the first activation zone 40 and second deactivation zone 46 is disposed adjacent to second activation zone 42. This arrangement of activation and deactivation zones define three detection regions R1, R2, and R3 and one diagnostic fault indication R0, as indicated in FIG. 2. Each detection region corresponds with a discrete position of the object being monitored. The fault indication R0 indicates that the shield has been over-extended or under-extended from the detection regions.

Figure 3:
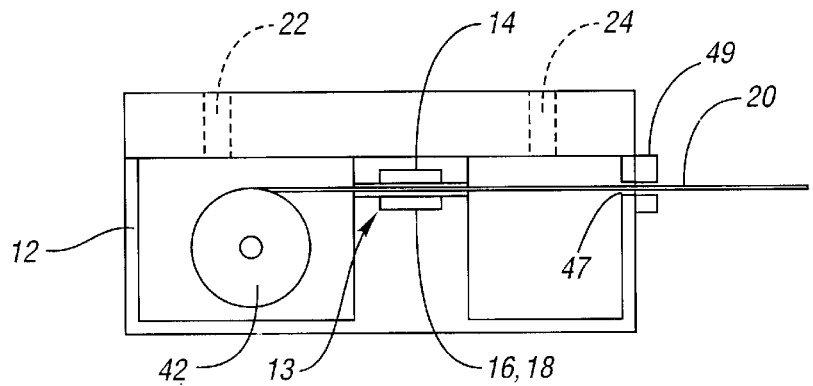
FIG. 3 is a cross-sectional view as indicated in FIG. 1 of the sensor system for determining vehicle seat location, in accordance with the present invention.

FIG. 3 is a cross-sectional view of sensor system 10 as indicated in FIG. 1, in accordance with the present invention. Sensor housing 12 has an elongated aperture 47 through which shield 20 passes. Further, a wiper 49 is disposed over aperture 47 for clearing shield 20 of debris and contaminants. Preferably, wiper 49 is comprised of a resilient material such as a plurality of brush bristles.

In an embodiment of the present invention, sensing element 13 is comprised of an emitter 14 and a pair of receivers 16 and 18. Emitter 14 is an optical light source and receivers 16 and 18 are optical receivers. Preferably, emitter 14 is an electro-luminescent device such as a light emitting diode (LED) or an incandescent lightbulb. Optical receivers 16 and 18 are, preferably phototransistors. Accordingly, the activation zones in this embodiment are translucent windows or slots and the deactivation zones are opaque areas. The translucent windows or slots allow lightwaves to reach the receivers 16 and 18 opposite the emitter 14 causing the receivers to transition to a high voltage level. The emitters and receivers are available, for example through Vishay Telefunken of Germany.

In operation, as shield 20 is protracted from spool 30 and withdrawn from sensor housing 12, first activation zone 40 and first deactivation zone 44 pass in front of emitter 14 and receivers 16 aid 18. As the first activation zone 40 passes between emitter 14 and receiver 16, receiver 16 is activated and transitions to a high voltage level. At the same time, first deactivation zone 44 passes between emitter 14 and receiver 18. The deactivation zone prevents light energy from reaching receiver 18 and thus causes receiver 18 to remain in a low voltage state. As retractable member 20 is further unwound from spool 30, emitter 14 and receivers 16 and 18 transition into detection region R2. Detection region R2 is characterized by both activation zones being disposed between emitter 14 and receivers 16 and 18. Therefore, both receivers 16 and 18 are activated by light energy passing through the windows or slots and will both be in a high voltage state. As shield 20 is further protracted from sensor housing 12, emitter 14 and receivers 16 and 18 enter region R3. While in region R3, second activation area 42 allows light energy to pass from emitter 14 to receiver 18 and the second deactivation area 46 prevents light energy from reaching receiver 16. Thus, receiver 18 will be in a high voltage state and receiver 16 will be in a low voltage state.

Referring now to FIG. 4, sensor system 10 is shown mounted to a vehicle seat 50, in accordance with the present invention. Generally, vehicle seat 50 is comprised of a bottom cushion 52 and a back cushion 54. The bottom cushion and associated framing is attached to a vehicle seat track 56. Vehicle seat track 56, generally is comprised of an upper seat track bracket 58 which is secured to vehicle seat 50 and a lower seat track bracket 60 which slidably engages upper seat track bracket 58 and is secured to a vehicle floor 62. As well known in the art, vehicle seat 50 via seat track 56 is movable between a rearmost position and a forwardmost position.

Referring now to FIG. 5, a cross-sectional view through sensor housing 12 and seat track 56 as denoted in FIG. 4 is further illustrated, in accordance with the present invention. Sensor housing 12 is mounted to upper seat track bracket 58 by conventional methods, such as using screws 70. Therefore, as the seat 50 and associated seat upper track 58 move with respect to the seat lower track bracket 60 and vehicle floor 62 the shield 20 is protracted from the sensor housing 12. As described previously, seat location may be determined by sensing the relative position of the sensing element 13 with respect to the activation and deactivation zones on shield 20. For example, typical sensor system voltage outputs for different vehicle seat locations are shown in Table 1 below.

TABLE 1

| ACTIVATION REGION & DIAGNOSTIC CONDITION | 1ST RECEIVER OUTPUT VOLTAGE | 2ND RECEIVER OUTPUT VOLTAGE | SEAT POSITION |
| --- | --- | --- | --- |
| Region 1 | High | Low | Mid to Rear |
| Region 2 | High | High | Middle |
| Region 3 | Low | High | Mid to Forward |
| Region 0/System Fault | Low | Low | N/A |

Figure 6:
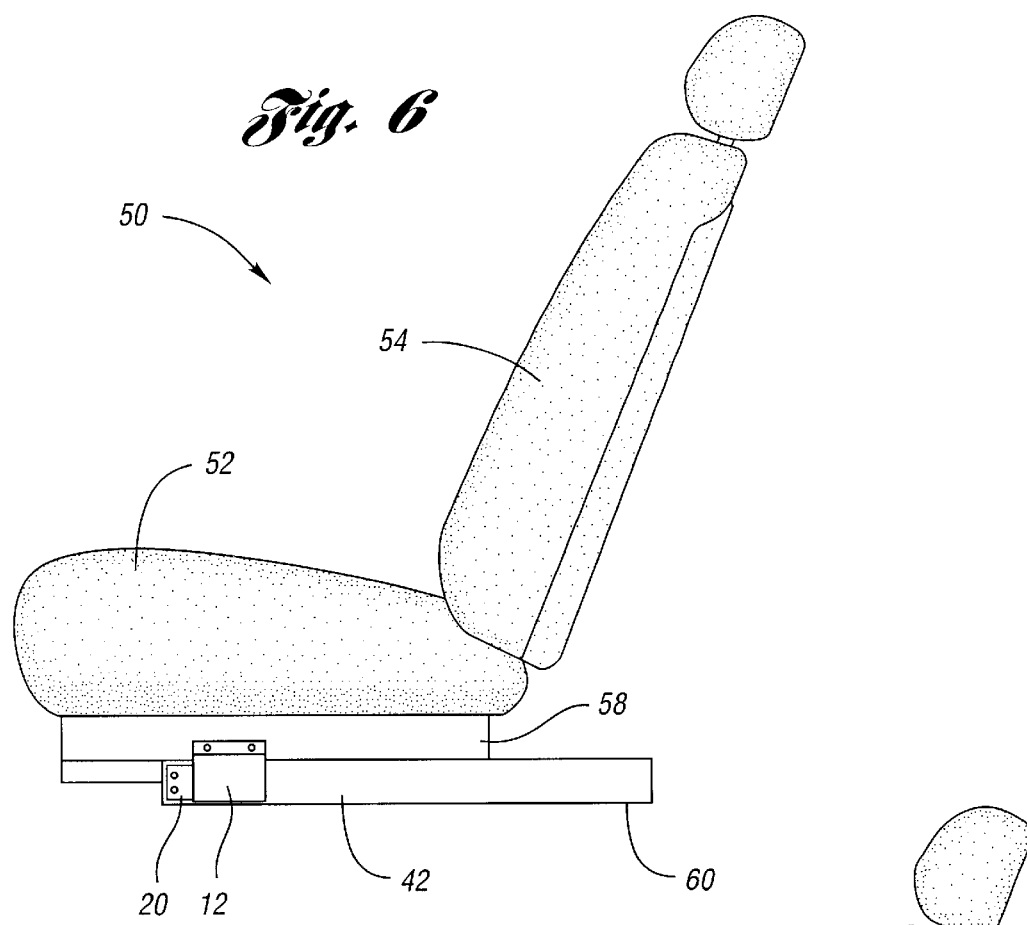
FIG. 6 is a side perspective view of the sensor system attached to a vehicle seat wherein the vehicle seat is positioned in the forward-most location, in accordance with the present invention.
Figure 7:
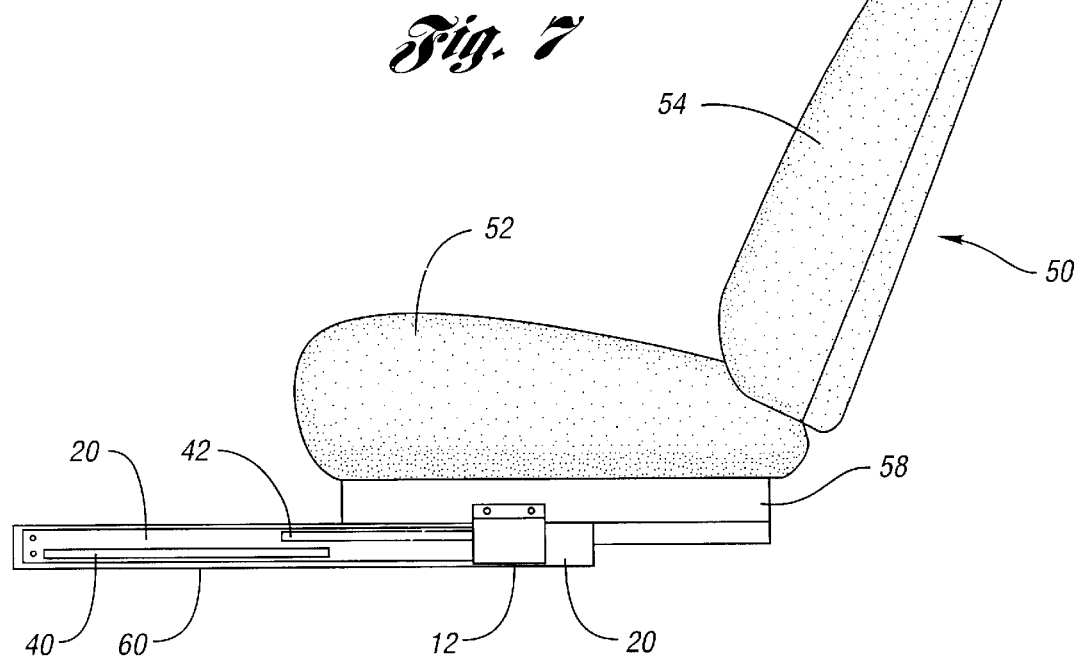
FIG. 7 is a side perspective view of the sensor system mounted to a vehicle seat wherein the vehicle seat is located in the rearward-most position, in accordance with the present invention.

Referring now to FIGS. 6 and 7, the vehicle seat is shown in its two extreme positions, in accordance with the present invention. FIG. 6 illustrates vehicle seat 50 in its forwardmost position, that is closest to the vehicle instrument panel. In this position, the first deactivation zone is disposed between emitter 14 and receiver 16 and the first activation zone is disposed between emitter 14 and receiver 18. Thus, this unique sensor system output allows the location of the vehicle seat to be determined. The sensor system output will not change until sensor housing 12 reaches the second zone where both the first and second activation zones are disposed between emitter 14 and receivers 16 and 18. FIG. 7 illustrates the vehicle seat positioned in the farthest rearward location in the interior of the vehicle. In this position, sensor housing 12 is disposed within the first detection zone wherein the first activation zone is disposed between emitter element 14 and receiver element 16 and the deactivation zone is disposed between emitter element 14 and receiver element 18.

Figure 8A:
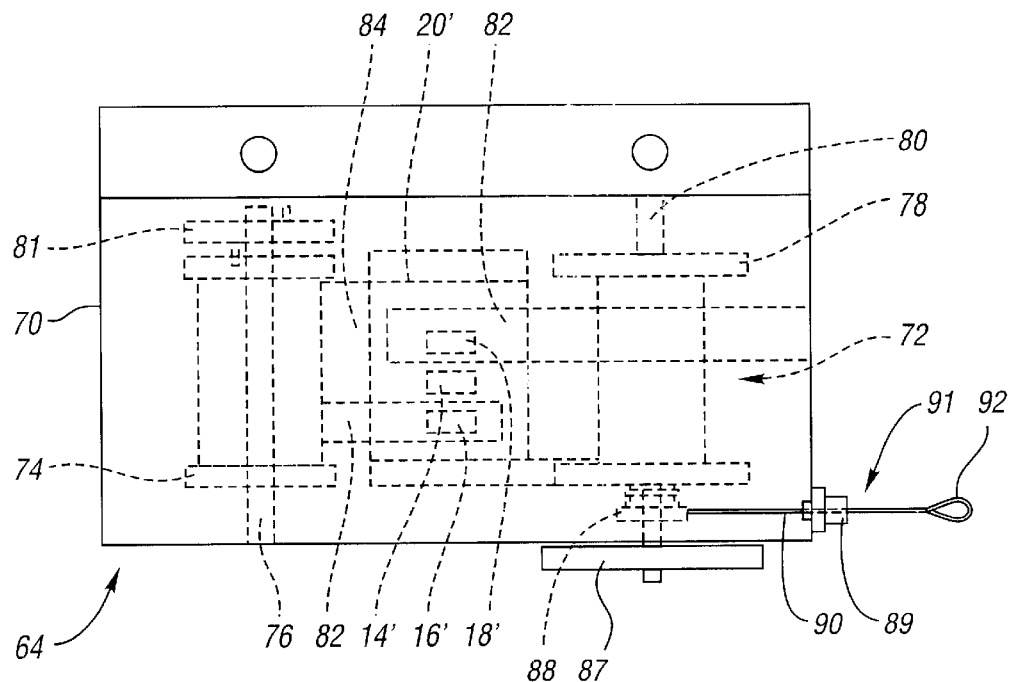
FIG. 8a is a front perspective view of the sensor system having a winding mechanism wherein the take-up spool has a larger radius than the drive spool, in accordance with the present invention.
Figure 8B:
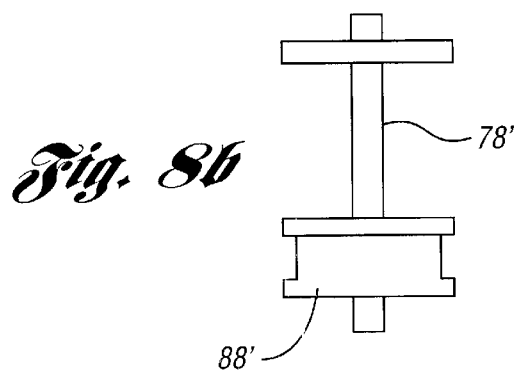
FIG. 8b is a front perspective view of a take-up spool and drive spool wherein the take-up spool has a smaller radius than the drive spool, in accordance with the present invention.
Figure 9:
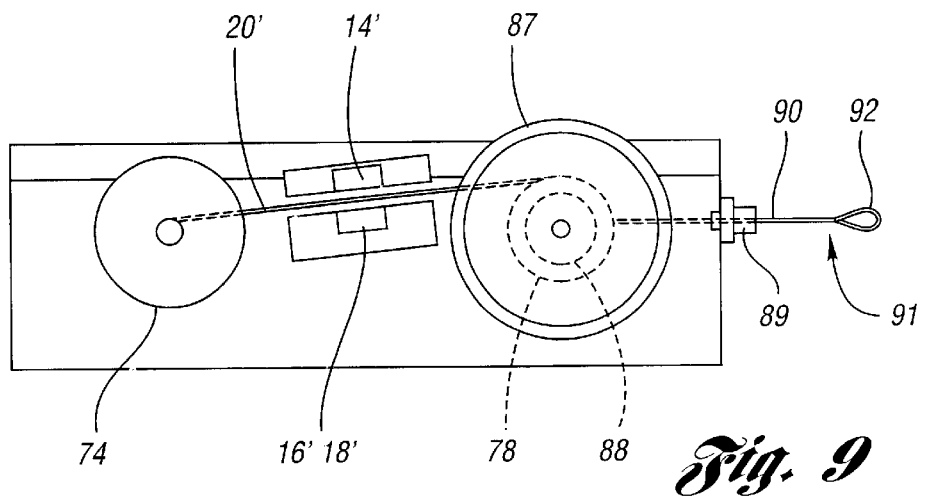
FIG. 9 is a top perspective view of the sensor system having a housing and a winding mechanism, in accordance with the present invention.

In an alternative embodiment, shown in FIGS. 8 and 9 a sensor system 64 having a housing 70 and a winding mechanism 72 is illustrated, in accordance with the present invention. Winding mechanism 72 has a payout spool 74 rotatably attached to housing 70 via payout post 76 and a take-up spool 78 rotatably attached to housing 70 via a take-up post 80. A coil spring 81 is attached at one end to housing 70 and attached at the other end to payout spool 74. Further, a shield 20' is attached at one end to payout spool 74 and at its other end to take-up spool 78. Coil spring 81 provides sufficient biasing force to rotate payout spool 74 in a rewind direction for retracting shield 20' from the take-up spool 78. As in the previous embodiment shield 20' has at least one activation area 82 and at least one deactivation area 84 which interact with emitter 14' and receivers 16' and 18' in the same manner as previously described.

Take-up spool 78 has at one end a drive spool 88 integrally formed therewith. Drive spool 88 has one end of a drive wire 90 fixedly attached thereto. Drive wire 90 is wound about drive spool 88 and has an external end 91 which extends outside of housing 70. Moreover, a stopper 89 secured to external end 91 of drive wire 90 prevents the drive wire from retracting back into housing 70. Additionally, drive wire 90 includes an eyelet 92 which allows easy attachablity of the drive wire to an object being monitored.

In operation, housing 70 is fixed to either a movable object or a fixed reference and eyelet 92 is attached to the other of the movable object and the fixed reference. As the object moves, drive wire 90 is withdrawn from housing 70, this causes drive spool 88 to rotate with respect to the housing and thus take-up spool 78 also rotates. The rotation of take-up spool 78 causes shield 20' to move past emitter 14' and receivers 16' and 18' while unwinding from payout spool 74. When the object moves in the opposite direction drive wire 90 retracts back into housing 70 under the retracting forces of coil spring 81. More specifically, coil spring 81 acts to rotate payout spool 74 in a rewind direction winding shield 20' onto payout spool 74 and unwinding the shield from take-up spool 78.

In an alternative embodiment, a drive wheel 87 is provided to sense the relative movement of a first portion of an object relative to a second portion of an object. The drive wheel 87 preforms the same function of the drive wire 90 as described above. Drive wheel 87 is fixedly attached to take-up spool 78 via take-up post 80 at its center and frictionally contacts the movable portion of the object being monitored at an outer edge of the drive wheel.

Figure 10A:
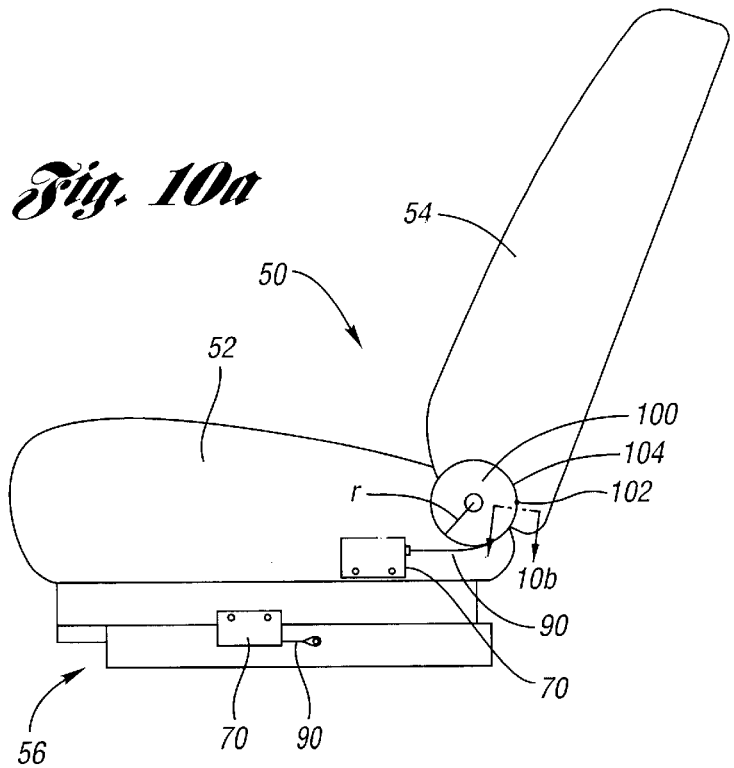
FIG. 10a is a side perspective view of the sensor system mounted to a vehicle seat for determining seat back inclination, in accordance with the present invention.
Figure 10B:
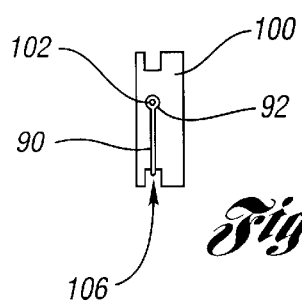
FIG. 10b is a cross-sectional perspective view of the seat back tilt mechanism illustrating the attachment of the drive wire thereto, in accordance with the present invention.
Figure 11:
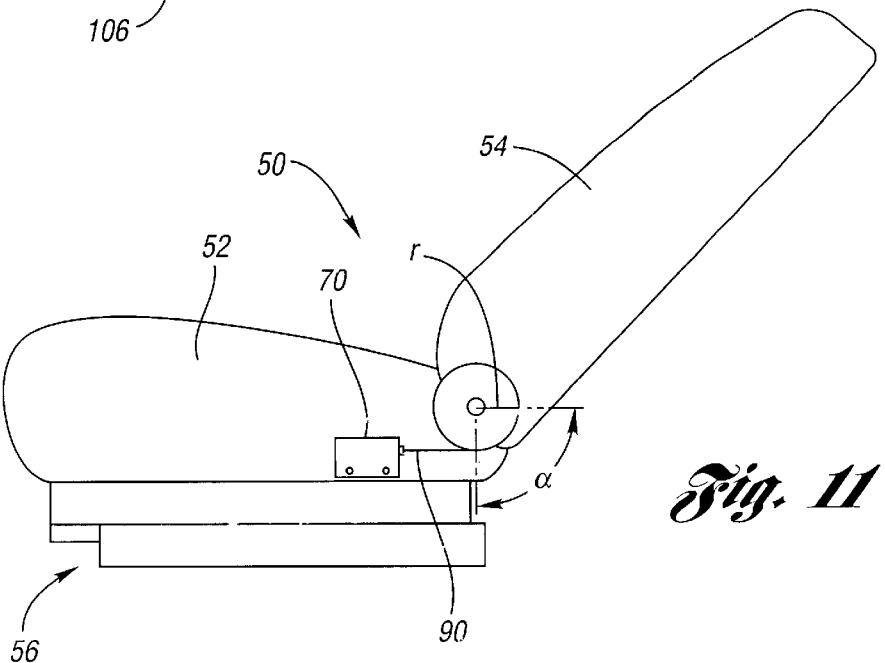
FIG. 11 is a side perspective view of the sensor system mounted to a vehicle seat for determining seat back inclination wherein the seat back is in the rear-most position, in accordance with the present invention.

The present invention is mountable to a vehicle seat track for determining seat position, as described above, however may also be mounted to a vehicle seat for determining seat back inclination, as illustrated in FIGS. 10*a*, 10*b* and 11. FIG. 10*a* is a side view perspective of housing 70 mounted to a vehicle seat structure, such as the upper seat track, and wherein the external end of the drive wire 90 is mounted to a seat back tilt mechanism 100. More specifically, the eyelet 92 of drive wire 90 is fixed to a drive post 102 on an outer edge 104 of the tilt mechanism 100, as illustrated in FIG. 10*b*. Further, a groove 106 is disposed in the tilt mechanism 100 for capturing drive wire 90.

In operation, as the seat back is inclined with respect to the vehicle floor drive wire retracts back into housing 70. As described previously, this retraction of the drive wire causes both the payout and take-up spools 74 and 78 to rotate and move the shield 20' past the emitter 14' and receivers 16' and 18'. The amount of drive wire retracted or protracted from housing 70 depends upon the radius (r) of the tilt mechanism 100 and the degree of rotation of the tilt mechanism through an inclination angle ($\alpha$). In turn the amount of movement of shield 20' is governed by the radii of the payout spool 74 as compared to drive spool 88. As shown in FIG. 8, when the radius of the payout spool 74 is larger than the radius of the drive spool 88 more shield is wound or unwound onto or from the take-up spool for each full rotation of the take-up spool as compared to the amount of drive wire 90 wound or unwound from the drive spool 88.

With reference to FIG. 8*b*, a take-up spool 78' and drive spool 88' are illustrated, wherein the take-up spool has a smaller radius than the drive spool 88', in accordance with the present invention. When this take-up and drive spool configuration are used in drive mechanism 72, less shield is wound or unwound onto or from the take-up spool 78' for each full rotation of the take-up spool as compared to the amount of drive wire 90 wound or unwound onto or from the drive spool 88'. The amount of shield or drive wire which is wound or unwound onto or from the take-up or drive spools is, of course, governed by the radii of the spools and the number of rotations.

Figure 12:
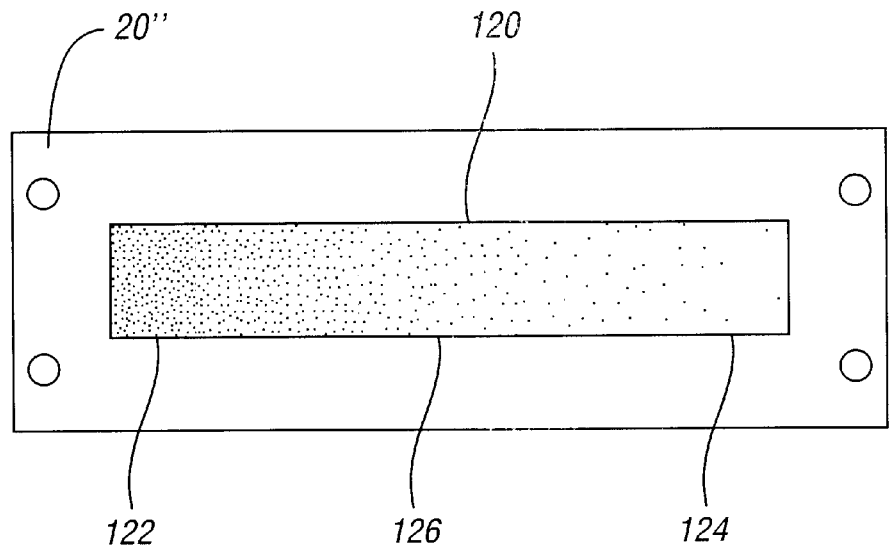
FIG. 12 is a perspective view of an alternative shield configured to cooperate with an emitter and receiver arrangement wherein the emitter is disposed adjacent the receiver, in accordance with the present invention.

Referring now to FIG. 12, an alternative shield 20" design is illustrated, in accordance with the present invention. Shield 20" is configured to cooperate with an emitter and receiver arrangement wherein the emitter is disposed adjacent the receiver. In this embodiment, shield 20" has a plurality of reflective particles disposed in a longitudinally extending area 120. The concentration of reflective particles varies from a high concentration at a high reflection end 122 to low concentration at a low reflection end 124. For example, high reflection end 122 may have 100% concentration of reflective particles (forming a mirrored surface) and low reflection end 124 may have 0% concentration of reflective particles (forming an opaque surface). Accordingly, the area between the high reflection end 122 and low reflection end 124 will gradually change in concentration of reflective particles, for example, a middle area 126 of longitudinally extending area 120 will have approximately a 50% concentration of reflective particles. The present invention contemplates the use of non-reflective particles for depositing over the longitudinally extending area 120, wherein area 120 has a reflective surface, to achieve a similar result as described above.

Figure 13:
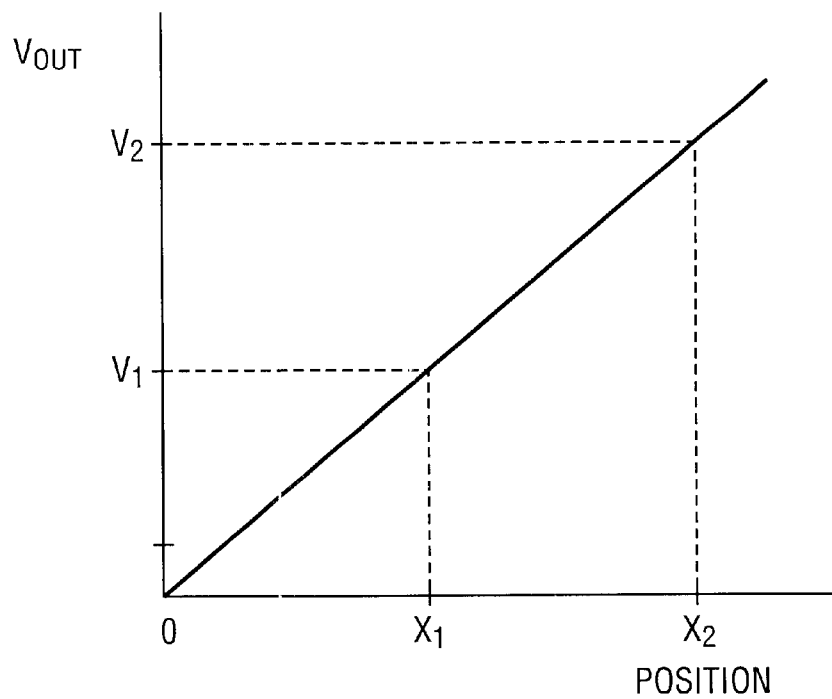
FIG. 13 is a chart illustrating the voltage output versus retractable member position of a sensor system having a varying reflective portion, in accordance with the present invention.

In FIG. 13 a typical sensor system signal output curve corresponding to a sensor system using shield 20" is illustrated. As shown the signal output varies linearly with the position of the sensor with respect to an end of shield 20". The sensor system signal output is a voltage or a current which is indicative of sensor 13 position with respect to an end of shield 20". For example, X1 denotes a location on shield 20" having a low concentration of reflective particles and X2 corresponds to a location on shield 20" having a high concentration of reflective particles. Accordingly, the voltage output corresponding to position X1 is V1 and for X2 the corresponding voltage is V2. The sensor system of the present invention provides an analog voltage output over the full range of movement of the object (vehicle seat) being monitored thus, the present embodiment provides a sensor system having greater precision than other embodiments where only discrete movements of the object are sensed. Of course, the present invention contemplates varying the concentration of reflective particles across area 120 to create a non-linear distribution of particles, as well as creating different particle distribution shapes or patterns. Accordingly, the sensor system output would correspond to the distribution of reflective or non-reflective particles creating a linear or non-linear relationship between sensor system output and location of sensor 13 on shield 20".

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A sensor system for detecting a movement of a first portion of a structure relative to a second portion of the structure, the sensor system comprising:
    a flexible retractable member having a first end pivotably attached to a first portion of the structure and a second end driven by the second portion of the structure, wherein the flexible retractable member is wound and unwound about the pivotal attachment upon relative movement of the first end with respect to the second end, the flexible retractable member has at least one activation portion and at least one deactivation portion, and the at least one activation zone is a longitudinally extending slot; and
    a sensor for detecting the at least one activation portion and the at least one deactivation portion for determining at least one position of the second portion relative to the first portion of the structure.

2. The sensor system of claim 1 wherein the sensor generates a first output signal indicative of detection of the at least one activation portion and a second output signal indicative of detection of the at least one deactivation portion.

3. The sensor system of claim 1 wherein the sensor further comprises an emitter and at least two receivers.

4. The sensor system of claim 3 wherein the at least two receivers generate a first output signal indicative of a first position of a portion of the structure, a second output signal indicative of a second position of a portion of the structure, a third output signal indicative of a third position of a portion of the structure and a fourth output signal indicative of a fourth position of a portion of the structure.

5. The sensor system of claim 1 wherein the sensor further comprises an electro-luminescent component in communication with at least one optical receiver.

6. The sensor system of claim 5 wherein the electro-luminescent component is a light emitting diode.

7. The sensor system of claim 5 wherein the electro-luminescent component is an incandescent light source.

8. The sensor system of claim 5 wherein the at least one optical receiver is a phototransistor.

9. The sensor system of claim 1 further comprising a sensor housing for holding the sensor adjacent the retractable member.

10. The sensor system of claim 1 wherein the at least one deactivation zone is a longitudinally extending opaque area.

11. The sensor system of claim 1 further comprising a payout spool for winding and unwinding the first end of the flexible retractable member thereabout.

* * * * *